Nov. 20, 1934.  C. B. FAVERTY  1,981,618
RAILWAY DRAFT VEHICLE
Original Filed Nov. 24, 1930   7 Sheets-Sheet 1
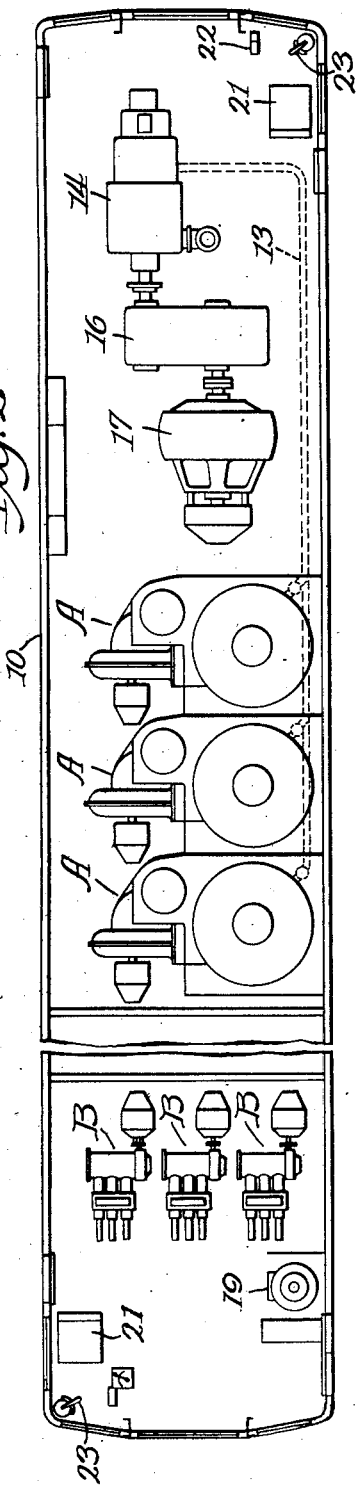
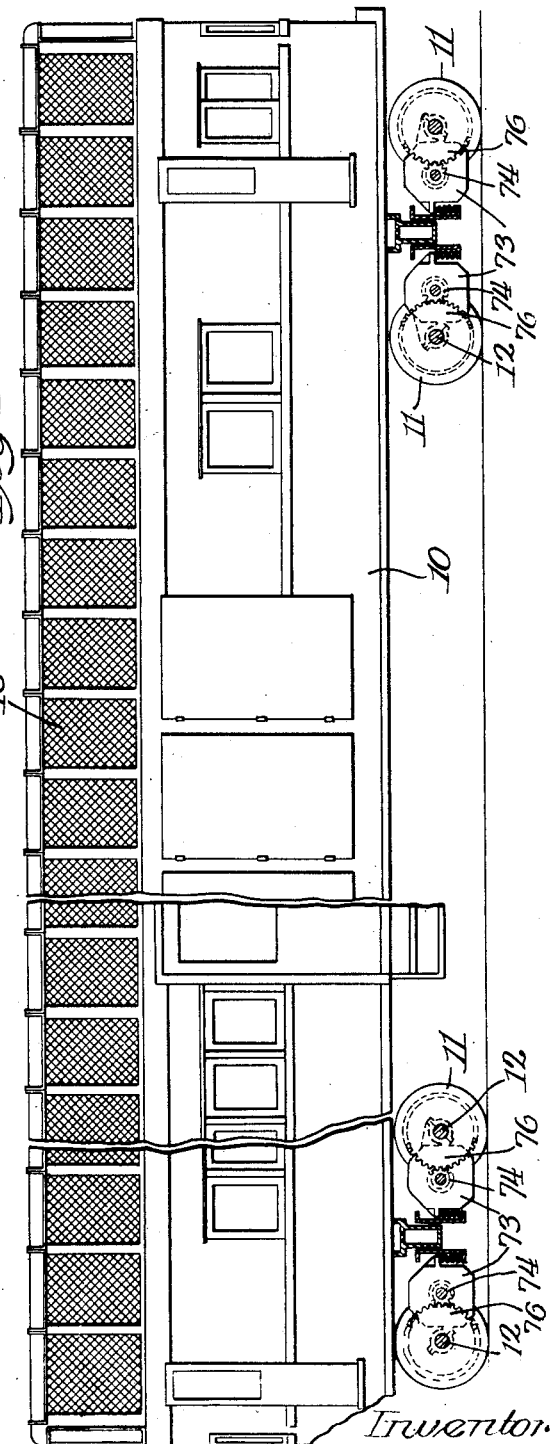
Inventor
Clyde B. Faverty
By George E. Mueller
Atty.

Nov. 20, 1934.  C. B. FAVERTY  1,981,618
RAILWAY DRAFT VEHICLE
Original Filed Nov. 24, 1930  7 Sheets-Sheet 2
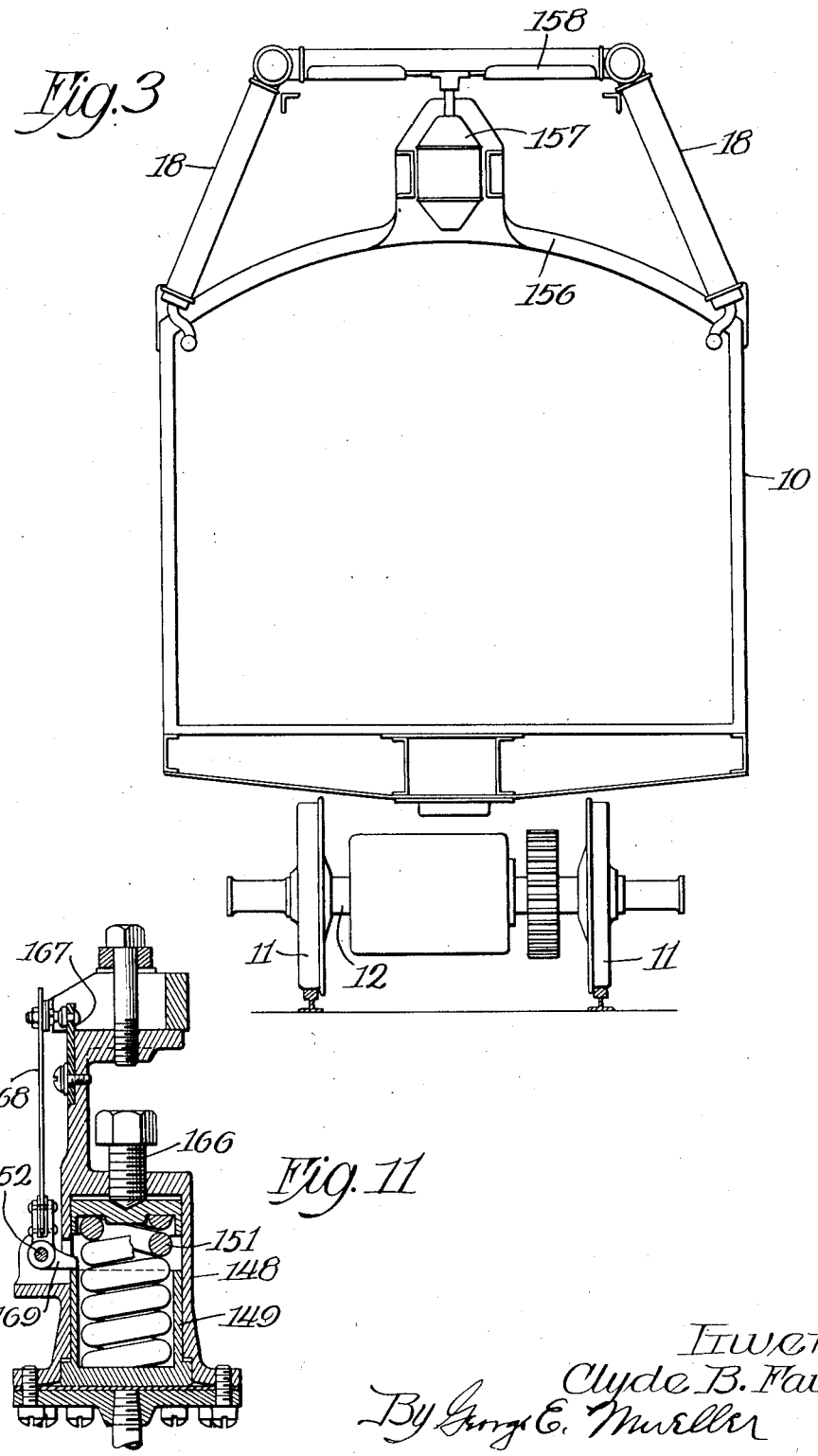

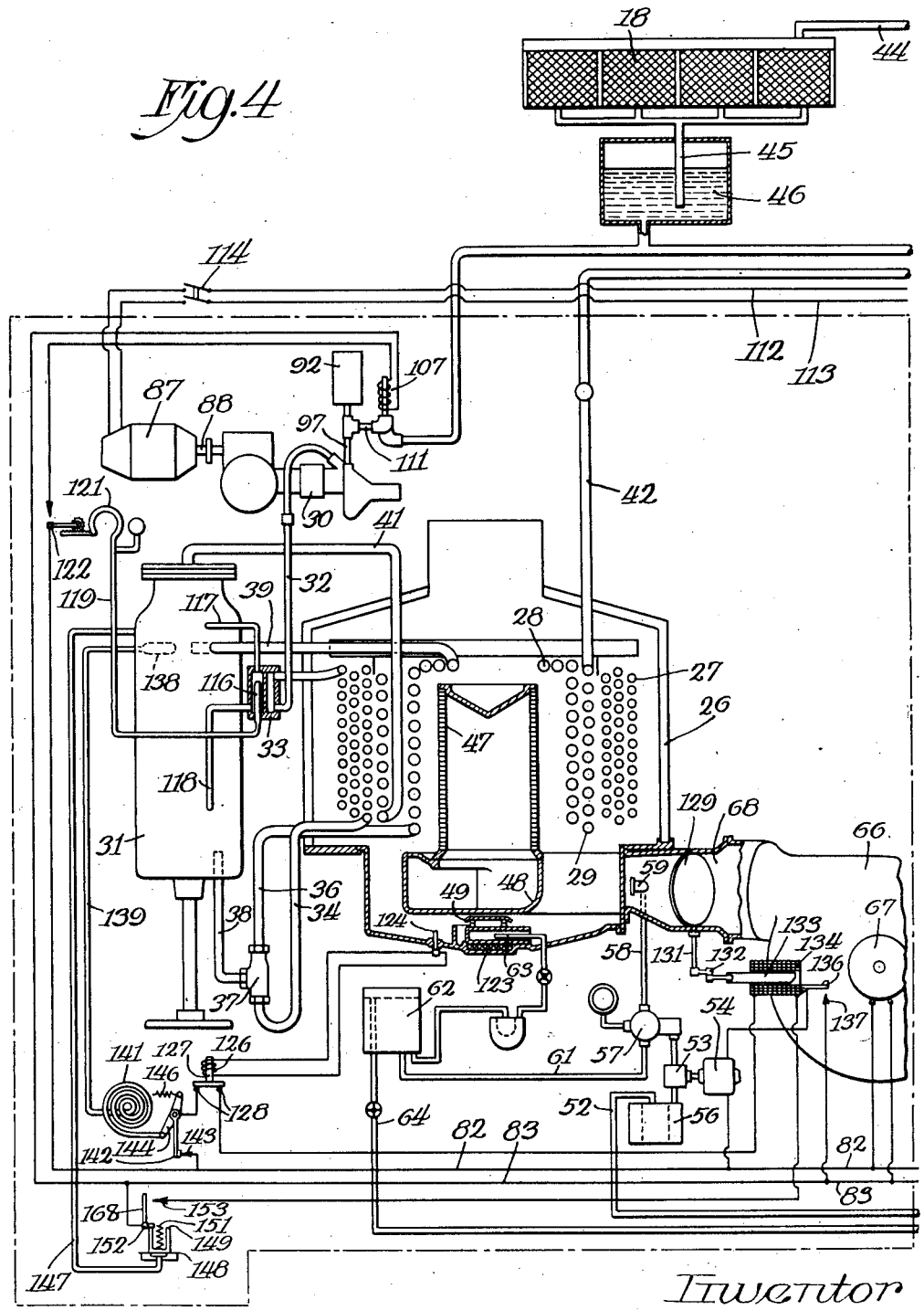

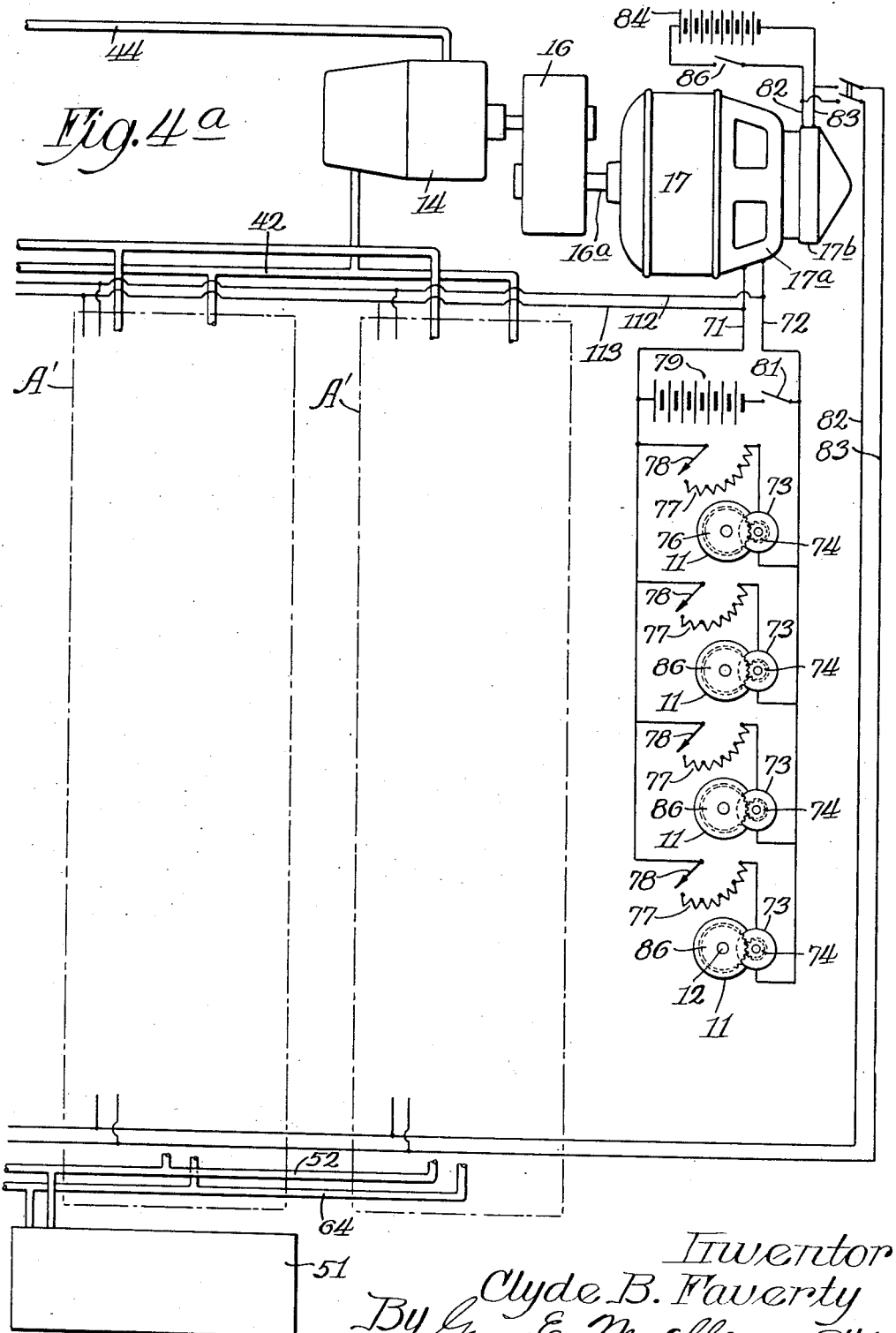

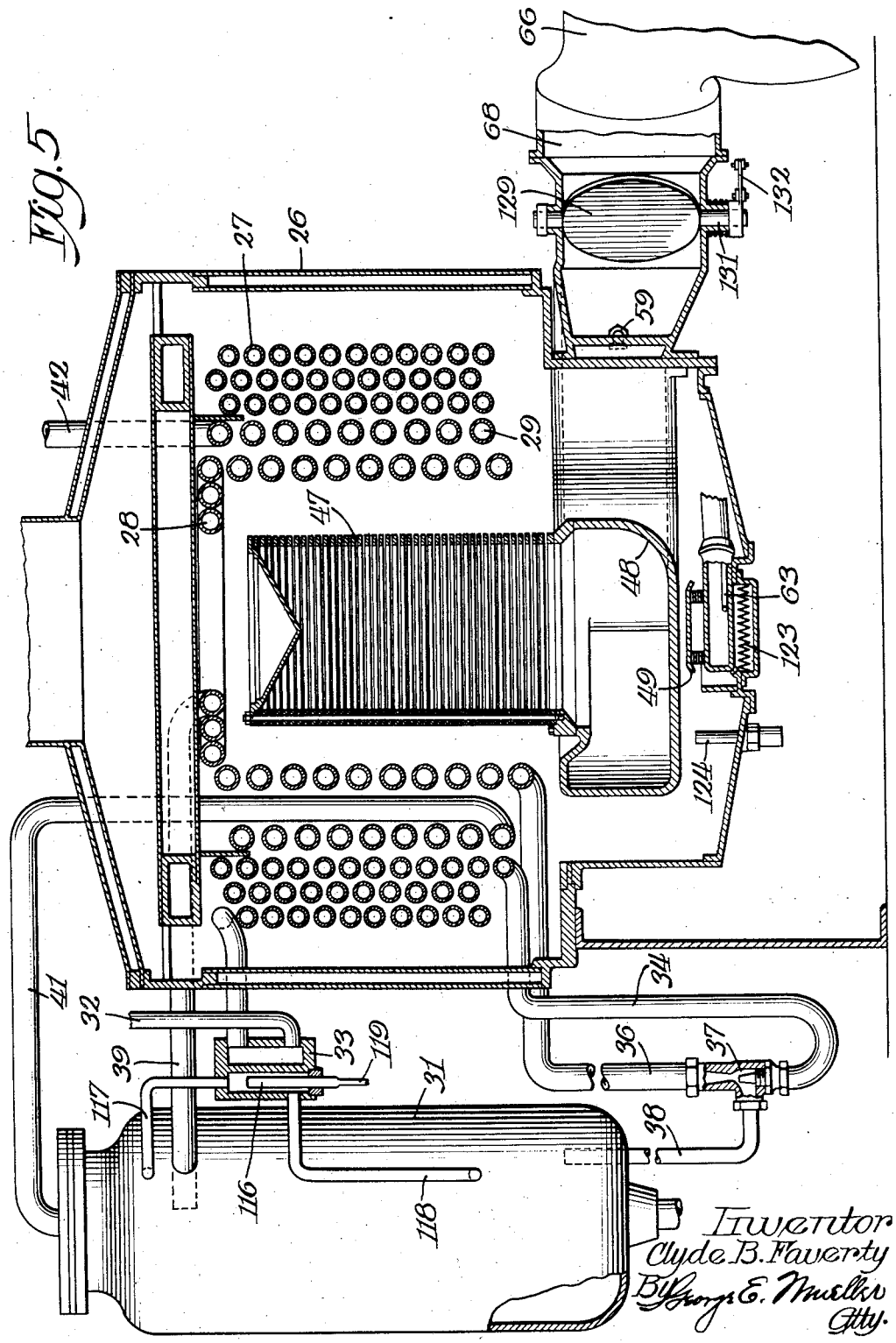

Nov. 20, 1934.   C. B. FAVERTY   1,981,618
RAILWAY DRAFT VEHICLE
Original Filed Nov. 24, 1930   7 Sheets-Sheet 6
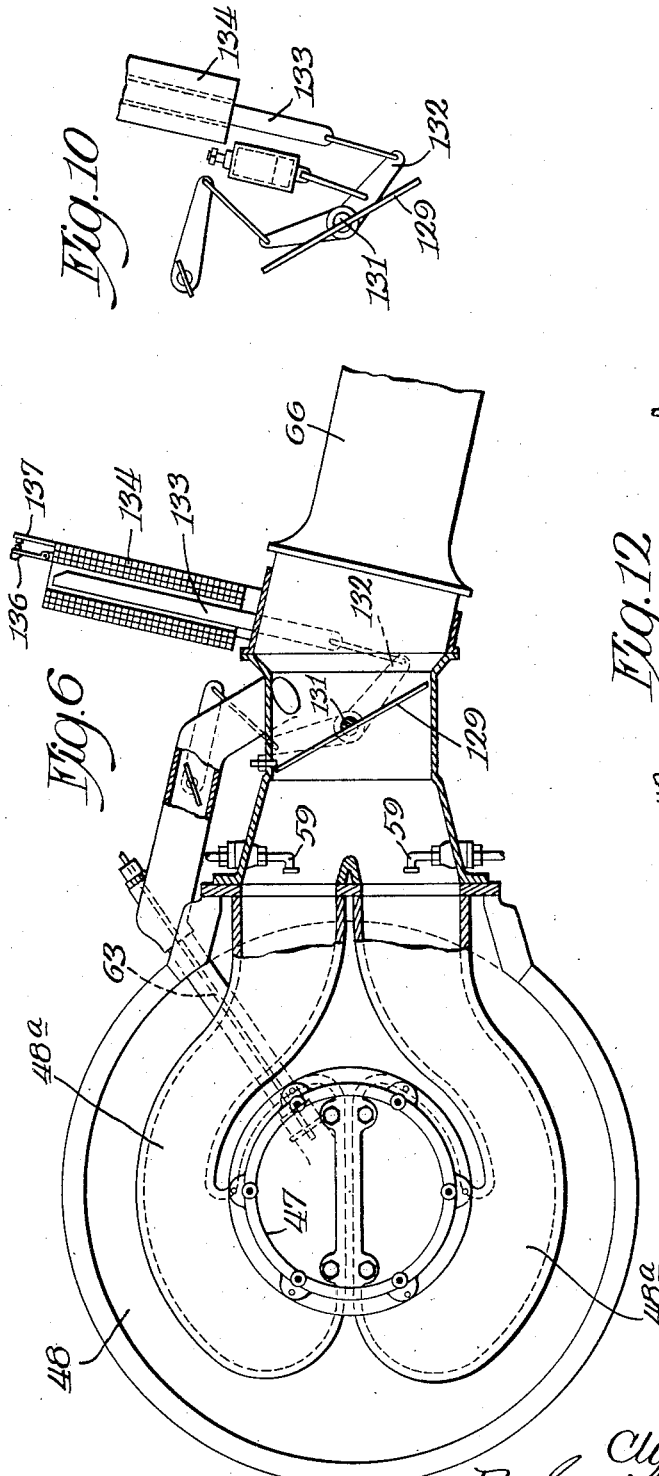
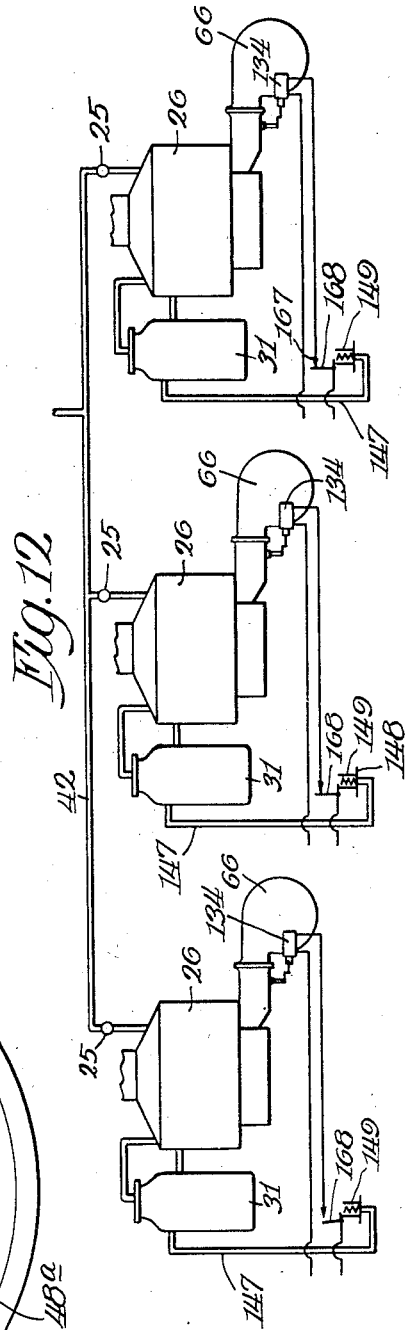
Inventor
Clyde B. Faverty
By George C. Mueller Atty.

Nov. 20, 1934.  C. B. FAVERTY  1,981,618
RAILWAY DRAFT VEHICLE
Original Filed Nov. 24, 1930  7 Sheets-Sheet 7
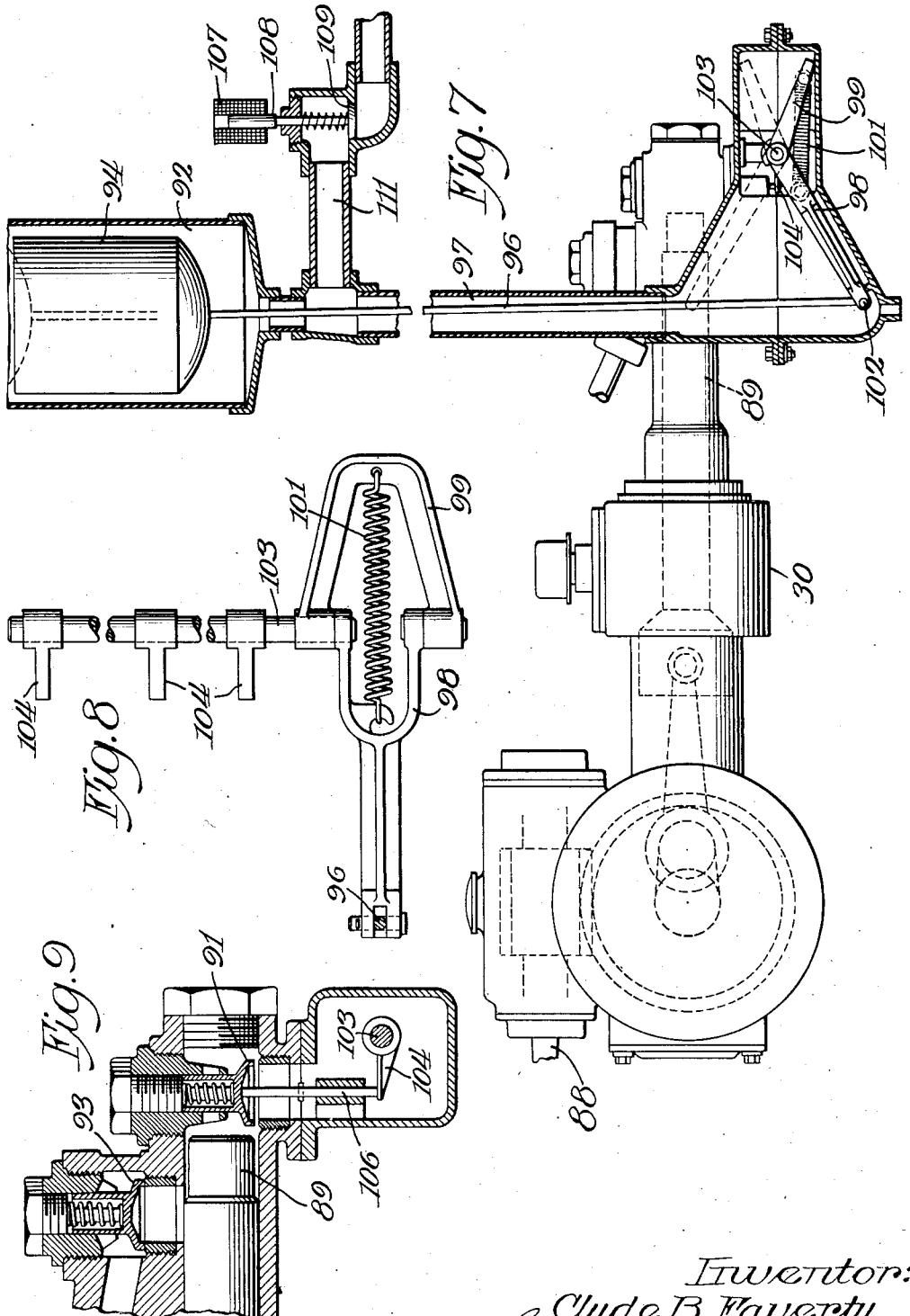
Inventor:
Clyde B. Faverty
By George E. Mueller Atty.

Patented Nov. 20, 1934

1,981,618

UNITED STATES PATENT OFFICE 1,981,618

RAILWAY DRAFT VEHICLE

Clyde B. Faverty, Chicago, Ill., assignor, by mesne assignments, to Ryan Car Company, a corporation of Illinois Application November 24, 1930, Serial No. 497,677
Renewed November 2, 1933

33 Claims. (Cl. 290—2)

My invention relates to a self-propelled railway vehicle. It relates more in particular to an improved type of electrically driven railway vehicle with improved means for generating its own electric power, whereby it may be operated satisfactorily under all circumstances and without connection with an outside power source.

The principal object of the present invention is the provision of an improved self-propelled railway car.

Another object is the provision of an improved type of electrically driven vehicle.

Another object is the construction of an electric locomotive having all the advantages in operation of the ordinary electric car, but adapted to be operated without connection to an outside power source.

Another object is the provision of an electric locomotive developing its own power and capable of drawing a relatively large number of coaches at express train speeds.

Another object is the provision of an electrically propelled railway draft vehicle particularly adapted for switching purposes and terminal service.

Another object is the provision of an electrically propelled railway draft vehicle of a type creating its own power without outside electric connections, which vehicle can be operated by only a single workman.

Another object is the provision of a railway draft vehicle which does not require expensive equipment installation and which at the same time consumes a minimum amount of stand-by fuel.

Another object is the provision of an improved type of power-electric railway draft vehicle which is devoid of objectionable noises, vibrations, and odors.

Another object is the provision of a vehicle of this type which can be used indefinitely without requiring to be withdrawn from service for minor types of repairs.

Another object is the provision of an improved steam generating system, particularly adapted for use in the combination as a whole.

Other objects and features of the invention will be apparent from a consideration of the following detailed description taken with the accompanying drawings, wherein, Fig. 1 is a side elevational view of the improved vehicle of my invention, Fig. 2 is a floor plan view thereof showing the disposition of equipment, Fig. 3 is a vertical, transverse, sectional view taken through the car and showing the condenser arrangement, Figs. 4 and 4A, taken together, are a schematic representation of the complete system including steam generating units, electricity generating units, vehicle driving units, etc., Fig. 5 is a vertical central sectional view taken through the steam generator, Fig. 6 is a plan view partly in section showing the details of the burner and controls therefor, Fig. 7 is an elevational view partly in section showing the water pump and control means therefor, Fig. 8 is an enlarged plan view of a feature of the pump, Fig. 9 is an enlarged fragmentary sectional view showing the valve mechanism of the pump, Fig. 10 is a detail of the draft control mechanism as applied to the burner, Fig. 11 is a detail of the fuel and air supply control, and Fig. 12 is a schematic view showing the manner in which the individual units may be separately controlled.

Regarding the general aspects of my invention I provide a steam generating system in which, utilizing a comparatively small amount of water which is continuously re-circulated, I generate steam at relatively high pressures and in sufficient quantities to operate a high-speed steam turbine. The turbine is designed to be driven at constant speed independently of the load applied thereto, the steam required to drive the turbine at no load being, of course, substantially less than that required to drive the turbine at full or maximum load. The turbine, through speed reducing gearing, drives a direct current electric generator and delivers power to direct current motors connected to have a direct drive on the axles of the car. Any usual means such as resistances or the like are employed to control the speed of the direct current motors so that the operation thereof as applied to the movement of the car is substantially the same as the operation of ordinary types of electrically driven vehicles making use of outside sources of electric power. The type of steam generating unit which I employ with very great satisfaction is a compact, relatively small unit employing steam and water circulating coils, and a storage steam and water separating drum, steam being withdrawn from the top of the drum and passed through superheating coils to the place of use. The burner is of a type to burn fuel oil at great heat intensities, producing a clear blue-flame type of combustion with very little radiant heat. This makes it possible to operate the burner and unit at full capacity, or almost instantaneously to stop the steam generation, due to the fact that the absence of radiant heat prevents the storing up of heat in great quantities in the unit. This ideally answers the purpose of a unit of this type in which the steam turbine is driven at constant speed, and changes from a no-load condition to a full load condition take place with great rapidity. The system as a whole immediately accommodates itself to the conditions set up by the operation of the electric motors. In order to operate a steam unit of this character efficiently it must be limited in size, and so in order to obtain all of the benefits of this type of unit and still have ample steam for the use of the high speed, relatively high powered turbine, I employ a number of these units, in the present embodiment three, and connect the outlet of each unit to a common steam line leading directly to the turbine.

Steam from the turbine is delivered to a common condenser which I run the full length of the vehicle in order to have ample radiating surface in all kinds of weather. The condensate is delivered to a hot water storage tank and from there back to the individual units, as required by the units. A number of safety devices are provided, as will be explained hereinafter, such devices being either electrically operated or electrically controlled. I have found that these devices operate more efficiently with a relatively lower voltage than that delivered to the vehicle driving motors, and accordingly, I mount directly on the shaft of the main direct current generator, a smaller, lower voltage generator, which delivers current to the controlling devices and to starting equipment which is used when starting the unit cold. Inasmuch as power to start the equipment is necessary before the generator can be operated, the smaller generator is made to charge at suitable times and under suitable conditions, a storage battery of suitable capacity.

I also provide a relatively high voltage, large capacity storage battery which floats across the main line from the direct current generator to the motors, this battery being designed to deliver current to the motors during starting and when a great load is applied to the motors, in order to increase the starting torque. When running at usual speeds and when the direct current generator is without substantial load from the motors, the charge will be replenished and so such battery will at all times be available for use when required, without requiring day to day and hour after hour attention from an operator, with the exception, of course, of usual maintenance requirements.

As to the car itself, shown in Figs. 1 to 3, inclusive, the car is built along the same general lines as a standard passenger coach, having space for carrying passengers or baggage if desired, with a body 10 and wheels 11 supporting axles 12, and in ordinary respects being substantially the same as any type of axle employed on power driven vehicles of this type. A plurality of steam generating units, indicated generally by the reference characters A, occupy the center portion of the car body and deliver steam through a common pipeline 13 to a steam turbine 14, which through speed reducing mechanism 16 drives a direct current generator 17. Each one of the steam units is operated alone, with the exception of the steam condenser 18 and other controls as will be described. Each unit has its own controlling mechanism, including water feed pumps shown in Fig. 2, and indicated generally by the reference characters B. The system is designed to conserve heat in every way possible, and so in order to maintain the requisite temperature within the car during the cold weather I provide any suitable type of heater 19. A valve 25, of the type known as a non-return valve is placed in the steam delivery line of each unit.

The car is designed to be driven in either direction from either end, a driver's seat 21 being provided at each end with a controller 22, air valve 23, and all other control equipment as may be required.

Reference may now be had to Fig. 4 in which the system as a whole is shown in somewhat schematic form. Instead of showing all of the steam generating units in detail, I have illustrated only one such unit with its control equipment and the like, and have indicated the other equipment schematically as at A', showing the necessary electrical, steam, water, and fuel connections running thereto.

I shall first describe the unit in connection with the water and steam portions thereof. Within a casing 26 are three sets of coils arranged concentrically, such coils being water preheater coils 27, water evaporator coils 28, and steam superheating coils 29. A steam and water separating drum 31 is provided and cooperates with the coils in a manner which will be pointed out. Water is delivered from a pump 30 through a pipe 32 to the water preheater coils, the water in passing to the coils going through a water level indicating and controlling device 33, the operation of which will be described hereinafter. A pipe 34 leads from the preheater coils and water is delivered therefrom through a pipe 36 to the evaporator coils 28. An injector 37 positioned between the pipes 34 and 36, withdraws hot water from the bottom of the drum through a pipe 38, whereby the water is recirculated, and there is always a full supply of water in the evaporator coils. The evaporator coils through a pipe 39 discharge saturated steam with some water particles into the top of the drum tangentially thereof, where the steam and water separate; the steam rising in the usual manner to the top of the drum. From a pipe 41 steam is withdrawn from the top of the drum for delivery to the superheater coils, from which the steam passes after being superheated through a pipe 42 to a common steam line 43, this line being common to all of the units, whereby a volume of steam is delivered to the turbine or other type of steam engine directly proportional to the number of units operating.

The turbine, the features of which will be referred to more fully hereinafter, exhausts its steam through a pipe 44 to the condenser 18. This condenser is built up of a number of sections, as will be described, and the condensate from all of the sections is delivered to a hot water supply tank 46, whence it is available for use at all times by the various units, each unit withdrawing water from the common hot water supply tank as required.

The mechanism of the individual pumps and the manner in which such pumps are supplied with water as the individual units require the same, will be explained more fully hereinafter.

The circulating coils are supplied with heat from a centrally disposed fuel oil burner 47. The type of burner shown and the controls and operation thereof have proven very satisfactory, and so such embodiment will be described. The burner proper is formed of a number of stacked and spaced rings, the combustible mixture being previously conditioned and forced out between the rings, as will now be set forth. The rings are mounted upon a casting 48 which as Fig. 6 shows, is in the form of a pair of question marks opposing each other so as to form two passageways 48a through which the fuel and incoming air pass, and in such passageways are completely vaporized by coming in contact with the metal surfaces which are maintained in a hot condition, the fuel having previously been atomized and having become mixed to some extent with the air before coming in contact with such surfaces. The manner of controlling the air and fuel will be explained in a subsequent paragraph. Immediately beneath the casting 48 and constituting a part of the main burner is an auxiliary burner or pilot burner 49 which burns at all times while the unit is in operation, serving to heat the casting 48 and so assist in the vaporization process, and also serving to ignite the gases passing through the rings of the main burner when the main burner comes on.

As to the fuel, a main fuel supply tank 51 is provided, fuel being withdrawn therefrom through a pipe 52 by a pump 53 driven by an electric motor 54, the fuel in passing to the pump 53 being strained through a straining device 56. The delivery side of the pump 53 is connected to a fuel distributing device 57 which is so designed that fuel is delivered through a line 58 to a plurality of separate nozzles 59 in proper quantities to supply such nozzles in accordance with the design of the unit, and fuel above such quantities is directed through a line 61 to a pilot burner supply tank 62. This tank is so arranged that it can feed to the pilot light supply nozzle 63 by gravity. An over-flow pipe 64 is provided in the tank 62 and excess fuel is returned to the tank 51. As the drawings show, common lines are provided for supplying fuel to the units A'. Regarding the air supply, a blower 66 driven by an electric motor 67 delivers air under pressure through an air duct 68 past the fuel supply nozzles 59 and so into the interior passageway 48a, and thence through the burner 47.

Before proceeding to a further description of the steam generator unit, reference will be made to the electrical portion of the system as organized around the steam turbine 14. This turbine, while specially designed for the car of my invention, is of any approved standard type, with control means whereby it is maintained in continuous motion at constant speed during the operation of the unit. Inasmuch as means for so controlling a turbine of this character are well known in the art, no detailed explanation or showing thereof is made.

The speed reducing means 16 is preferably a gear drive which, through its driven shaft 16a, operates the direct current generator 17. This generator preferably is a two-part generator; that is, two generators in one having a single armature shaft. The portion 17a generates at relatively high voltages, while the portion 17b generates current at lower voltage, such current being adapted for use in the control and regulation of the steam generator units.

As to the high voltage line, a pair of conductors 71 and 72 carry the current to motors 73 which by means of gears 74 meshing with gears 76 integral with the axles 12, drive the vehicle. These motors are controlled by suitable resistances 77 which are cut in or out of the motor circuit by switch arms 78, these switch arms being a part of and operated by the controller 22 (Fig. 2). The motors are connected in parallel, preferably in the general manner indicated in the drawings. The starting amperage of the motors can be controlled in any suitable way, as, for example, by the use of starting resistances, series parallel connections, through differential generator windings, or the like. Further reference will be made to the motors hereinafter.

In addition to the motors a battery 79 is also connected across between the lines 71 and 72 in such a manner as to add to the power available for starting and the like, or whenever a heavy load is placed upon the equipment. During light load conditions or when the vehicle is stationary and the steam turbine and generator operating at the usual constant speed, the battery will be recharged. While the type of service to which my draft vehicle is adapted to be used at times will almost require the use of the battery, still, for ordinary operation of a vehicle of this kind it can be constructed without the battery and good results secured. In designing the equipment, the plan is so laid out that the battery can either be included or excluded, if desired. In order to make it possible to cut the battery entirely out of the system, any suitable type of switch 81 is employed.

Current from the low voltage portion of the generator 17b is carried by the conductors 82 and 83 for delivery to the control devices, as will be described. A storage battery 84 is bridged across the line in such a way as to receive a charge from the generator, and so that during starting, current from the battery can be employed for the purpose. A suitable switch 86 is provided for cutting out the battery 84 when desired.

As was previously described in connection with the handling of the feed water, the condensate is delivered to a hot water tank 46 and is from there distributed to the various units in the manner and in the proportions required. In order to understand the method of withdrawing the water from the tank 46 and charging it to the units, reference may be had to Figs. 7, 8 and 9. The pump which was indicated generally by the reference character 30 is continuously driven by an electric motor 87 (see Fig. 4), and through a shaft 88, which through suitable gearing, crank shaft mechanism, and the like, operates a plurality of plungers 89. These plungers draw water through an intake valve 91 from a hot-well 92 and force such water through an exhaust valve 93 into the pipe 32 and thence to the water preheater coils. The motor 87 is continuously operated and so provision must be made to prevent the charging of air to the preheater coils which would occur if the pump would continue to function when there was no available water supply. To obviate this difficulty I provide a mechanism controlled by a float 94 in the hot-well, said float having an operating rod extension 96 extending through a vertical water line 97, through which the water passes from the hot-well to the intake valve. The purpose of the mechanism to be described is to maintain the intake valves in open position when the water in the hot-well falls below a predetermined amount. To accomplish this result I provide an over-center type of snap switch having a pair of pivoted members 98 and 99 connected together at points away from their pivot points, by a tension spring 101. The extreme end of the arm 98 is pivoted at 102 to the lower end of the rod 96, and the member 99 is directly connected to a shaft 103 carrying a plurality of valve operating fingers 104. As appears clear therefore, movement of the member 99 will be accompanied with movement of the fingers 104. These members are positioned to either engage or disengage a rod 106 which is connected to the valve 91 so that upward movement thereof will have the effect of opening the valve. In the operation of this mechanism, as the water level is decreased so as to lower the position of the float 94, the member 98 is gradually forced downwardly, until it brings the spring over the center or pivot point, at which time the tension in the spring will rotate the member 99 quickly, thus immediately turning the shaft 103 and operating the fingers 104, with the result that the rods 106 are engaged and the water intake valves opened. Even though the pump as a whole continues to move, it has no effect in the pumping of the water, as the water will merely swish back and forth through the intake valves. The operation of the mechanism is reversed when water flows into the hot-well 92, and raises the float sufficiently to again throw the switch and take the fingers 104 out of engagement with the rods 106.

I shall now indicate the manner in which the water is withdrawn from the storage tank 46 and delivered to the individual units. When water in the drum of the individual unit is lowered sufficiently to affect certain control mechanism which will be described hereinafter, a solenoid 107 is energized (Fig. 7), thus drawing up a plunger type of armature 108 which opens a valve 109, allowing water from the storage tank 46 to flow, preferably by gravity, into the water system of the individual unit. It is delivered at a place to make it available to the pump, and also to make it available to the hot-well for the proper operation of the mechanism associated therewith. In the present embodiment the water from the storage tank is supplied through a tank 111 to the vertical pipe 97, the connection being just below the hot-well as shown.

The motor 87 is continuously operated, and for this motor I prefer to use the higher voltage generated by the portion 17a of the generator, conductors 112 and 113 being connected to the main lines 71 and 72 for conveying the current to the motor 87. A suitable type of switch 114 is provided in order to start and stop the motor as required.

I shall now refer to some of the control features of the system. I previously referred to the water level indicating and controlling device 33 through which the feed water passes. This comprises a two chamber housing through one chamber of which the feed water passes, and in the other chamber of which is a mercury bulb 116, the top of the chamber being connected to the upper or steam portion of the drum by a pipe 117, and the bottom part of the chamber being connected by a pipe 118 to the lower or water portion of the drum. A pipe 119 containing mercury and forming a continuation of the bulb 116 has connected thereto an expansion device 121 adapted to close a switch 122 when the mercury in the bulb 116 expands, such expansion being effective by means of the pipe 119 to operate the expansion device 121. During the time that a normal water level is maintained in the drum the bulb 116 will be covered with water; and since the relatively colder feed water is at all times passing close to the bulb, it is maintained entirely cool and the mercury is not expanded. However, when the water becomes lower, an increasingly greater portion of the bulb is exposed to the steam, which increases the temperature of the bulb despite the action of the feed water, and so causes an expansion of the mercury or other liquid contained in the bulb. The switch 122 either opens or closes an electric circuit, whereby the solenoid 107 is either energized or deenergized to regulate the flow of feed water in the manner described.

It will be recalled that the pilot burner 49 heats the casting 48 to assist in vaporizing the main burner charge and also functions to ignite the vaporized combustible mixture when the main burner is turned on. In order to preliminarily heat the pilot burner a resistance 123 is provided immediately below the vaporizing casting forming a part of the pilot burner, this resistance being supplied with energy from the battery 84, and being controlled by a suitable switch (not shown) which may be part of a general starting system, which starting system is not shown here in detail. Since the main burner is ignited by the pilot light burner it is a desirable feature to prevent the turning on of the main burner to supply a combustible mixture thereto when the pilot light is not burning in such a way as to ignite the combustible mixture. In order to bring about this result I provide a thermo-electric couple 124 adjacent the pilot burner to receive heat from the burner and generate a current, which through suitable means energizes a solenoid 126, which solenoid has associated therewith a plunger type of armature 127 which is adapted to make or break electrical contacts 128. When the thermoelectric couple is heated by the pilot burner, this results in closing the contact 128, thereby completing a circuit which permits the operation of the fuel supply system as will now be set forth.

An air passageway 68 contains a butterfly type of damper 129 turnable on suitable trunnions and integrally connected with a shaft 131 to which a bell crank 132 is secured. This bell crank is connected by suitable linkage to an armature plunger 133 reciprocable within an electro-magnet 134. When this magnet is energized it draws the plunger inwardly so as to open the butterfly valve, permitting the blower to force air to the burner.

The motor 54 driving the fuel pump 53 is normally inoperative except when the main burner is ignited. It is desirable that the fuel be supplied immediately to the separate nozzles 59 when the valve 129 is opened. This is controlled by the plunger 133 striking one of a pair of contacts 136 and 137, thus closing the circuit including the motor 54, and connecting the motor 54 across the main lines 82 and 83 of the low voltage system.

I wish also to prevent the operation of the main burner when the temperature in the drum 31 is raised above a predetermined amount, which is figured as an index of the character of operation of the unit. To this effect a bulb 138 is placed in the steam portion of the drum and has a connection 139 leading to an expansion device 141 forming part of a switch, which switch includes and is adapted to open or close electrical contacts 142 and 143. Contact 142 is carried on an arm which turns on a common pivot with a bell crank member 144, one end of the bell crank having a spring 146 tending to move the assembly in a position to close the contacts 142 and 143, and the other end of the bell crank being connected to the expansion device 141. When the temperature in the upper part of the drum is raised above the predetermined amount previously spoken of, the fluid therein expands and the expansion is conveyed through the connection 139 to expansion device 141, thereby drawing the bell crank to move the same in a clockwise direction against the action of the spring 146 to open the contacts 142 and 143. The contacts 142 and 143 are included in a circuit supplying power to the solenoid 134. This complete circuit will be traced later.

In operating the individual burners I make no attempt to regulate the fuel consumption and consequent heat produced, except by the maximum and minimum limits. That is, as far as the main burner is concerned, the operation of the device is either fully on or fully off at all times. I control the operation of the burner in this respect by the steam pressure, having found that I can maintain the pressure substantially between the limits of approximately six hundred pounds and six hundred fifty pounds steam pressure per square inch. The manner in which this is accomplished in the present embodiment is as follows:

A steam line 147 of relatively small capacity is connected to the top of the drum and the other end thereof connected to a cylinder 148, having a piston 149 reciprocable therein. This piston is adapted to be forced by the pressure of the steam against a compression spring 151. When forced against the action of the spring the piston strikes one arm of a bell crank lever which is pivoted at 152, and the other arm thereof making contact with a terminal 153, or breaking contact, depending upon the direction of movement thereof. Briefly, if the steam reaches a predetermined pressure for which the spring 151 is regulated, it will move the piston against the spring 151 and rotate the bell crank in a counterclockwise direction to open the circuit running to the solenoid 134, and so prevent the operation of the main burner. When the steam pressure diminishes, the power of the spring overcomes the pressure of the steam and the reverse motion takes place, with the effect of energizing the solenoid 134, assuming that all conditions are favorable to operation of the burner.

Regarding the circuit including the solenoid 134, this circuit extends from line 83, through contact 153, to the solenoid, through contact 128, contacts 142 and 143, and back to the main line 82. In other words, this circuit includes three adjusting or controlling devices, all of which must be functioning satisfactorily so as to satisfy the necessary conditions before the burner is ignited.

Regarding the construction and operation of the condenser 18, this may be done in different ways, as long as care is exercised in having available ample heat radiating surfaces under all weather conditions, and means for controlling the relative cooling effect of the radiating surfaces so that the steam will all be condensed but the condensate will retain considerable residual heat to maintain the efficiency as a whole. As Fig. 3 shows, the condenser is arranged in a plurality of units along the sides of the car near the top thereof. The roof 156 of the unit is built somewhat low so that an open space is provided above the vehicle roof and between the condensers. At each unit an electric motor 157 is mounted to drive a fan 158 which draws air in through the sides and over the heat radiating surfaces of the condenser, the air being exhausted from the compartment above the roof and between the condensers but passing directly upwardly through the fan area. In this way some advantage is taken of the natural tendency for heated air to rise in a straight line, and other advantages in cooling and in the operation of the sections generally are secured. It will be understood that there is a separate fan or fans for each condenser section and means is provided for operating any selected number of said fans so that the cooling can be controlled within fairly close limits.

Regarding more general features of the unit, the steam generating units supply sufficient steam to the turbine to generate one thousand horse power at speeds of between six and seven thousand R. P. M. The direct current generator is designed to operate at a speed of twelve hundred R. P. M., and at such speeds generates six hundred fifty volts. I have found that a unit of this type can be operated with only about eight percent loss of power between the turbine and generator; in other words, it is 92% efficient. The voltage at which the auxiliary electric equipment operates is approximately sixty four volts, and the secondary generator is designed to produce this voltage with sufficient current to care for the needs of the various electrical units.

As regards the thermal efficiency of the steam generating units, as previously described, the non-radiant character of the flame aids in preventing heat losses by excessive radiation, as well as makes possible the accurate control of the steam pressure within predetermined limits. Such heat losses as do occur by direct radiation through the casing 26 for example, are compensated for by drawing air for the blower over the exposed outside surfaces of the unit. These units being housed in the manner illustrated, this air is drawn into the housing from the interior body of the car, and the air in the car is therefore, constantly being moved toward the steam generating units, and heat losses which do occur in other moving units, for example the steam turbine and the like, are made use of by this movement of the air. It is for this reason that additional heating means 19 is provided for heating the interior of the car during cold weather.

I have not shown a detailed air system including the usual air brakes, air controls, and the like, but the car is adapted to employ the usual air equipment.

I have described the manner in which the burners in the individual units are controlled in response to the steam pressure. Since a common steam line receives steam from all of the units, and since through the common line the units are all interconnected, it follows that substantially the same pressure will prevail throughout the various units. I can adjust the burner means so that the burners will all come on and off at substantially the same time; that is to say, that the combustible mixture will be supplied to the units individually but all at the same time when the steam pressure in the system is lowered a predetermined amount. Conversely, when the steam pressure in the system reaches a pre-determined point, the several units may be cut out at the same time, this being accomplished by the mechanism described, which shuts off the supply of fuel and air.

In the preferred manner of operating the system, however, the fuel and air controlling means are adjusted preferably to bring the several steam generating units into operation at different steam pressures, and render them ineffective at different steam pressures. For example, if I have adjusted my steam system to operate between 600 and 700 pounds of steam pressure, I can cut all of the units out to prevent further generation of steam, when a steam pressure of 700 pounds has been attained in the system. When adjusted in accordance with my preferred system, however, when the steam pressure would be decreased, for example to 650 pounds, one of the units is rendered operative in response to the lowered steam pressure by supplying a combustible mixture of fuel and air thereto. If the steam pressure is maintained, then at 650 only the single unit will be operated. If, however, the load demands increase, the next unit may be operated at 625 pounds pressure and the third unit at, for example 600 pounds pressure. These figures are merely illustrative, as I may prefer to operate the different units on a difference of only a few pounds pressure, for example 10 pounds. I have found that when starting the units, as the pressure is lowered, I can adjust the regulating devices to very close limits so that if set to operate a unit at 650 pounds pressure, the error, if any, will be not more than one or two pounds on either side of 650.

Instead of cutting all of the units out at the same pressure, I can cut them out progressively and sequentially as the steam pressure is increased. In actual operation I prefer to control the units in this manner. While I have found that the maximum pressure is not readily controlled within as close limits as the minimum pressure, still due to the fact that the burner produces very little radiant heat, for practical purposes substantially accurate pressure regulation can be obtained. Whatever error takes place is uniform in the different units, so the progressive and sequential operation thereof is obtained.

With the system shown and described, it is obvious that the steam generation is substantially directly proportional to the load conditions at the motor, and a change in the load conditions is immediately effective to increase the steam generation in the units. In other words, the steam system responds instantly to the demands made upon it, substantially as readily as the generator and turbine respond to the demands of the motor.

The value of the system as applied to a vehicle of this character from the standpoint of operating results is clear. I have found additional advantages in the fact that all of the equipment may be mounted in a car in a very compact manner.

Fig. 11 shows one form which the steam pressure operated circuit breaking device may be constructed. The main parts thereof are numbered in accordance with the description of the schematic lay-out of Fig. 4, including a cylinder 148, plunger 149, and spring 151. The spring tension is regulated by a screw 166. In the form shown, a permanent magnet 167 is secured to the frame work forming a part of the cylinder 148, and the arm 168 carrying one of the terminals is normally attracted to the permanent magnet and the terminals are closed. The arm is pivoted at 152 and has a finger 169 in the path of the piston 148, so that when the piston is raised by the action of the steam, the arm 168 will be turned about the pivot 152 and break the contact at the terminals 153. It is obvious from the showing that the tension of the spring 151 can be regulated within close limits by means of the regulating screw 166.

Fig. 12 is a schematic lay-out indicating just enough of the structure to disclose the manner in which the pressure regulating device may be controlled so that each one of the units may be operated on a slightly different steam pressure than the others. In this figure, one of the units would not be functioning to generate steam, while the other two would be operating at full capacity in accordance with the design of the unit shown.

In connection with the operation of the condenser, the system affords a very simple means for securing a proper distribution of the steam in the different condenser sections. Since the supply tank 46 at all times contains a relatively large supply of water, the pipe 45 leading from the condenser to the supply tank is submerged in the water in the tank so that the delivery of condensate from the condenser always takes place under water. Not only does this form a seal to prevent the possibility of delivery of steam to the water pumps, but it causes the formation of a back pressure on the condenser, which I have found just sufficient to bring about the most desirable distribution of steam in the condenser. In the present system wherein a single hot water supply tank is employed connected directly into the system and supplying the various units as water is required by them, it is clear that this advantageous result is secured substantially without any additional equipment. In other words, merely the point of discharge of the pipe 45 is sufficient to secure the good results described.

I wish to point out an advantage resulting from the use of the steam system herein described, an advantage attending the use of the system whether with a turbine electric drive as herein disclosed or if used with other types of drive. This is that the system furnishes what is in effect a reserve steam supply which is available whenever the system is called upon to deliver the same. It is well known that in standard locomotive practice when a grade is approached, for example, and a locomotive is going at a predetermined rate of speed, in order to maintain such rate of speed over the grade, a larger amount of steam is necessary than when proceeding on a straightaway. This larger amount of steam may be somewhat beyond the normal capacity of the steam boiler to produce, but the construction of the locomotive furnishes a reserve steam supply which may be built up before the grade is reached, and this reserve steam supply is available for use when the demand is made for it. In my system the unit may proceed along a straightaway with only two of the steam units in operation. The cutting in of the third unit (any number of units may of course be used) furnishes to the prime mover the reserve power necessary in unusual circumstances. It is believed that the manner in which this reserve power is furnished is clear from the preceding detailed description. It may be pointed out that with my invention, however, the reserve steam power is not made use of until the emergency actually exists, whereas in the locomotive the reserve steam must be built up somewhat in advance of the time at which it is used.

What I claim as new and desire to protect by Letters Patent of the United States is:—

1. In a railway draft vehicle, a wheeled body, a plurality of steam generator units, each including a fuel oil burner, steam and water circulating coils positioned adjacent the burner, a steam and water separating drum, and steam superheater coils connected to withdraw steam from said drum, a common steam line into which the superheater coils deliver steam, a steam engine driven by steam from said common steam line, a condenser receiving steam discharge from said engine, means for redelivering and distributing condensate from said condenser to the steam generator units, an electric generator driven by said engine, and wheel driving motors driven by power developed by said electric generator.

2. In a railway draft vehicle, a wheeled body, a plurality of steam generator units, each including a fuel oil burner, steam and water circulating coils positioned adjacent the burner, a steam and water separating drum, and steam separating coils connected to withdraw steam from said drum, electrically operated means for controlling the burner and supplying combustible mixture thereto, a common steam line into which the superheater coils deliver steam, a steam engine driven by steam from said common steam line, a condenser receiving steam discharge from said engine, means for delivering condensate back to the generator units, an electric generator driven by the engine, wheel driving motors operated by current from said electric generator, and a second electric generator driven by the engine and adapted to supply current to said burner controlling means.

3. In a railway draft vehicle, a wheeled body, a plurality of steam generating units adapted to generate steam rapidly and at relatively high pressures, a common line for receiving steam from said units, a constant speed steam turbine driven from steam supplied by said common line, means for condensing steam and redelivering and distributing the resulting condensate to the generating units, an electric generator driven by said turbine, wheel driving motors driven by direct current supplied by said generator, and a second electric generator for supplying power for said steam condensing and distributing means.

4. In a railway draft vehicle, a wheeled body, a plurality of steam generating units, each unit having a burner and steam and water circulating coils, a common steam line receiving the steam output of the units, a constant speed steam turbine operated by steam from said common line, a steam condenser receiving the steam discharge of said turbine, a storage tank for heated water into which the condensate from said steam condenser flows, a separate water pump for each unit, and means cooperating with each steam generating unit for automatically causing the operation of its associated pump to draw water from the storage tank and force the same into the unit, when the supply of water in said unit runs below a predetermined amount.

5. In a railway draft vehicle, a wheeled body, a plurality of steam generating units, each unit having a burner and steam and water circulating coils, a common steam line receiving the steam output of the units, a constant speed steam turbine operated by steam from said common line, a steam condenser receiving the steam discharge of said turbine, a storage tank for heated water into which the condensate from said steam condenser flows, a separate water pump for each unit, means cooperating with each steam generating unit for automatically causing the operation of its associated pump to draw water from the storage tank and force the same into the unit, when the supply of water in said unit runs below a predetermined amount, and an electric generator driven by said turbine.

6. In a railway draft vehicle, a wheeled body, a plurality of steam generating units, each unit having a burner and steam and water circulating coils, a common steam line receiving the steam output of the units, a constant speed steam turbine operated by steam from said common line, a steam condenser receiving the steam discharge of said turbine, a storage tank for heated water into which the condensate from said steam condenser flows, a separate water pump for each unit, means cooperating with each steam generating unit for automatically causing the operation of its associated pump to draw water from the storage tank and force the same into the unit, when the supply of water in said unit runs below a predetermined amount, speed reducing gearing driven by said turbine, and an electric generator driven by said speed reducing gearing at constant speed, but slower than said turbine.

7. In a railway draft vehicle, a wheeled body, a plurality of steam generating units, each unit having a burner and steam and water circulating coils, a common steam line receiving the steam output of the units, a constant speed steam turbine operated by steam from said common line, a steam condenser receiving the steam discharge of said turbine, a storage tank for heated water into which the condensate from said steam condenser flows, a separate water pump for each unit, means cooperating with each steam generating unit for automatically causing the operation of its associated pump to draw water from the storage tank and force the same into the unit, when the supply of water in said unit runs below a predetermined amount, an electric generator driven by said turbine, and wheel driving motors driven by power supplied by said direct current generator.

8. In a railway draft vehicle, a wheeled body, a plurality of steam generating units, each unit having a burner and steam and water circulating coils, a common steam line receiving the steam output of the units, a constant speed steam turbine operated by steam from said common line, a steam condenser receiving the steam discharge of said turbine, a storage tank for heated water into which the condensate from said steam condenser flows, a separate water pump for each unit, means cooperating with each steam generating unit for automatically causing the operation of its associated pump to draw water from the storage tank and force the same into the unit when the supply of water in said unit runs below a predetermined amount, speed reducing gearing driven by said turbine, an electric generator driven by said speed reducing gearing at constant speed, but slower than said turbine, and wheel driving motors driven by power supplied by said direct current generator.

9. In a railway draft vehicle, a wheeled body, a plurality of steam generating units, each unit having a burner and steam and water circulating coils, a common steam line receiving the steam output of the units, a constant speed steam turbine operated by steam from said common line, a steam condenser receiving the steam discharge of said turbine, a storage tank for heated water into which the condensate from said steam condenser flows, a separate water pump for each unit, means cooperating with each steam generating unit for automatically causing the operation of its associated pump to draw water from the storage tank and force the same into the unit when the supply of water in said unit runs below a predetermined amount, a generator driven by said turbine, and a second electric generator also driven by said turbine and developing a lower voltage than said previously mentioned electric generator, and adapted to supply current to said automatically operated pump controlling means.

10. In a railway draft vehicle, a plurality of steam generating units, a common pipe line receiving steam from said units, a steam engine driven by steam from said common line, and an electric generator driven at substantially constant speed by said steam engine, each of said units having a fuel oil burner and means for controlling the operation thereof by the steam pressure, and each of said controlling means being responsive to a different steam pressure.

11. In a railway draft vehicle, a plurality of steam generating units each having a burner, means for operating the burners in response to the steam pressure developed by the generators, each burner being responsive to a different steam pressure, a common pipe line for receiving the steam from the separate units, a steam engine driven by steam supplied by said common pipe line, and an electric generator driven by said steam engine.

12. In a railway draft vehicle, a plurality of steam generating units each having a burner, means for operating the burners in response to the steam pressure developed by the generators, each burner being responsive to a different steam pressure, a common pipe line for receiving the steam from the the separate units, a steam engine driven by steam supplied by said common pipe line, means for condensing steam discharged from said steam engine and returning the condensate to the units, and an electric generator driven by said steam engine.

13. In a railway draft vehicle, a plurality of steam generators, each having a burner, means for firing the burners when the steam pressure is lowered to a predetermined level and for extinguishing the burners when the steam pressure attains a predetermined height, a common steam line for receiving steam from the units, a constant speed steam turbine driven by steam supplied from said common line, an electric generator driven by said turbine, and wheel driving motors driven by electric current supplied by said generator.

14. In a railway draft vehicle, a plurality of steam generators, each having a burner, means for firing the burners when the steam pressure is lowered to a predetermined level and for extinguishing the burners when the steam pressure attains a predetermined height, a common steam line for receiving steam from the units, a constant speed steam turbine driven by steam supplied from said common line, an electric generator driven by said turbine, and wheel driving motors driven by electric current supplied by said generator, a second electric generator producing current at relatively lower voltage, driven by said turbine, and means for supplying said current to the burner controlling mechanism for the operation thereof.

15. In a railway draft vehicle, a plurality of steam generators, each having a burner, means for firing the burners when the steam pressure is lowered to a predetermined level and for extinguishing the burners when the steam pressure attains a predetermined height, a common steam line for receiving steam from the units, a constant speed steam turbine driven by steam supplied from said common line, an electric generator driven by said turbine, and wheel driving motors driven by electric current supplied by said generator, said burners, firing and extinguishing mechanism being adjusted so that each of the burners will be fired in response to a different steam pressure.

16. In a railway draft vehicle, a plurality of steam generating units, each having a burner, means for supplying air and fuel to the burners, means responsive to increased steam pressure for rendering the air and fuel supplying means ineffective, a common steam line for receiving steam from said units, a substantially constant speed steam turbine receiving steam from the common steam line, a steam condenser for receiving discharge steam from the turbine, means for returning condensate to the steam generators, an electric generator driven by said turbine and motors driven by current supplied by said generators.

17. In a railway draft vehicle, a plurality of steam generating units, each having a burner, means for supplying air and fuel to the burners, means responsive to increased steam pressure for rendering the air and fuel supplying means ineffective, a common steam line for receiving steam from said units, a substantially constant speed steam turbine receiving steam from the common steam line, a steam condenser for receiving discharge steam from the turbine, means for receiving condensate from the condensers and redelivering and distributing the same to the separate steam generating units when additional water is required by the units, an electric generator driven by said turbine, and motors driven by current supplied by said generators.

18. In a railway draft vehicle, a plurality of steam generating units, each having a burner, means for supplying air and fuel to the burners, means responsive to increased steam pressure for rendering the air and fuel supplying means ineffective, a common steam line for receiving steam from said units, a substantially constant speed steam turbine receiving steam from the common steam line, an electric generator driven by said turbine, and motors driven by current supplied by said generators, the means for rendering the air and fuel supply ineffective being designed to render each burner responsive to a different steam pressure.

19. In a railway draft vehicle, a plurality of steam generating units, each having a burner, means for supplying air and fuel under pressure to the burners, means responsive to lowering of steam pressure for actuating the air and fuel supply means, each burner being supplied with air and fuel in response to a different steam pressure, a common steam line for receiving steam from the plurality of steam generating units, a constant speed steam turbine operated with steam from said common steam line, a generator driven by said turbine, and motors adapted to be driven by current from said generator.

20. In a railway draft vehicle, a plurality of steam generating units, each having a burner, means for supplying air and fuel under pressure to the burners, means responsive to lowering of steam pressure for actuating the air and fuel supply means, each burner being supplied with air and fuel in response to a different steam pressure, a common steam line for receiving steam from a plurality of steam generating units, a constant speed steam turbine operated with steam from said common steam line, a condenser receiving exhaust steam from the turbine, means for delivering condensate to the units, a generator driven by said turbine, and motors adapted to be driven by current from said generator.

21. In a railway draft vehicle, a plurality of steam generating units, each having a burner, means for supplying a combustible mixture to the burner, and means for rendering the supplying means ineffective when the steam pressure increases to a predetermined point, and for again actuating the mixture supplying means when the pressure is lowered to a predetermined point, each of the burners being supplied with the combustible mixture at a different steam pressure, a steam turbine for receiving steam from all of units and supplying the same to the steam turbine, an electric generator driven by said turbine, and a motor adapted to be driven by the current from said electric generator.

22. In a railway draft vehicle, a plurality of steam generating units, each having a burner, means for supplying a combustible mixture to the burner, and means for rendering the supplying means ineffective when the steam pressure increases to a predetermined point, and for again actuating the mixture supplying means when the pressure is lowered to a predetermined point, the mixture supplying means for each unit being rendered ineffective at a different steam pressure, a steam turbine, means for receiving steam from all of the units and supplying the same to the steam turbine, an electric generator driven by said turbine, and a motor adapted to be driven by the current from said electric generator.

23. In a railway draft vehicle, a plurality of steam generating units, each having a burner, means for supplying a combustible mixture to the burner, and means for rendering the supplying means ineffective when the steam pressure increases to a predetermined point, and for again actuating the mixture supplying means when the pressure is lowered to a predetermined point, the mixture supplying means for each unit being actuated in response to a different steam pressure, and said means being rendered ineffective in each unit in response to a different steam pressure, a steam turbine for receiving steam from all of units and supplying the same to the steam turbine, an electric generator driven by said turbine, and a motor adapted to be driven by the current from said electric generator.

24. In a railway draft vehicle, a plurality of steam generating units, a turbine driven by steam from the units, an electric generator driven by the turbine, an electric motor adapted to be driven by current from the generator, and means for sequentially and progressively bringing the steam units into operation in response to the load demand on the motor.

25. In a railway draft vehicle, a plurality of steam generating units, each having a burner, means for supplying combustible mixture to each burner and means for rendering the supplying means ineffective when the steam pressure increases to a predetermined point, and for again actuating the mixture supplying means when the pressure is lowered to a predetermined point, each of the burners being supplied with the combustible mixture at a different steam pressure.

26. In a railway draft vehicle, a plurality of steam generating units, each having a burner, means for supplying air and fuel under pressure to the burners, means responsive to lowering of steam pressure for actuating the air and fuel supply means, each burner being supplied with air and fuel in response to a different steam pressure, a common line for receiving steam from the plurality of steam generating units, a steam propelled prime mover, a condenser receiving exhaust steam from the prime mover, and means for returning the condensed steam from the condenser to the separate units in accordance with the demand of such units.

27. In a railway draft vehicle, a plurality of steam generating units, a common line for receiving steam from the units, a prime mover driven by steam from said line, a condenser receiving exhaust steam from the prime mover, a water supply tank, a connection from the condenser to the water supply tank for delivering condensate to said tank, the delivery end of said pipe being under the level of water in the tank, and means for supplying the individual units with water from the tank as required thereby.

28. In a railway draft vehicle, a wheeled body, a plurality of steam generators including fuel oil burners and steam and water circulating coils, a single steam line connected to receive steam from said generators, a steam driven engine having a connection to said common steam line for driving the same, a condenser, means for delivering exhaust steam from said engine to the condenser, means for receiving condensate from the condenser and redelivering and distributing the same to the steam generators as water is required by them, and means for utilizing the power from said steam engine for driving the wheels of said vehicle.

29. In a railway draft vehicle, a body, trucks having wheels supporting said body, a steam generating plant comprising a plurality of relatively small units each having a burner and steam generating coils receiving heat from said burner, a common steam line into which all of said units are adapted to deliver steam, a prime mover driven by steam from said common line, means for driving said wheels by power supplied by said prime mover, and means for causing said steam generating plant to deliver steam to said prime mover in proportion and in response to load variation on said wheels.

30. In a railway draft vehicle, a plurality of steam generating units, a common pipe line adapted to receive steam from all of said units, a plurality of burners each forming a part of each steam generating unit, and means responsive to steam pressure in said common line for controlling the operation of said burners, the controlling means for each burner being responsive to a different steam pressure.

31. In a railway draft vehicle, a wheeled body, a steam power plant housed in said body and comprising a plurality of units, each unit having a burner and steam generating coil, a common line adapted to receive steam from all of the units of said steam generating plant, means for utilizing said steam to drive the wheels of the vehicle, and means for causing said generating plant to deliver steam to said common line in proportion to and in response to load on said wheels.

32. In a railway draft vehicle, a plurality of steam generating units, each having a burner, means for supplying air and fuel under pressure to the burners, a common steam line adapted to receive steam from all of said steam generating units, and means responsive to the steam pressure in said common line for actuating the air and fuel supply means, each burner being supplied with air and fuel in response to a different steam pressure.

33. In a railway draft vehicle, a plurality of steam generating units, each having a burner, means for supplying a combustible mixture to the burner and means for rendering the supplying means ineffective when the steam pressure increases to its predetermined point, and for again actuating the mixture supplying means effective when the steam pressure is lowered to a predetermined point, the mixture supplying means for each unit being rendered ineffective at a different steam pressure.

CLYDE B. FAVERTY.